United States Patent [19]

Farhat

[11] Patent Number: 4,995,088
[45] Date of Patent: Feb. 19, 1991

[54] SUPER RESOLUTION

[75] Inventor: Nabil Farhat, Philadelphia, Pa.

[73] Assignee: Trustees of the University of Pennsylvania, Philadelphia, Pa.

[21] Appl. No.: 441,195

[22] Filed: Nov. 22, 1989

Related U.S. Application Data

[63] Continuation of Ser. No. 36,490, Apr. 9, 1987, abandoned.

[51] Int. Cl.⁵ ............................................... G06K 9/62
[52] U.S. Cl. ....................................... 382/15; 382/14; 364/513
[58] Field of Search ........................ 382/1, 14, 15, 36; 364/513, 807; 365/49

[56] References Cited

U.S. PATENT DOCUMENTS

| | | | |
|---|---|---|---|
| 3,766,532 | 10/1943 | Liebel | 340/172.5 |
| 3,766,533 | 10/1973 | Black | 340/172.5 |
| 4,254,476 | 3/1981 | Burrows | 364/513 |
| 4,470,048 | 9/1984 | Short, III | 382/34 |
| 4,471,470 | 9/1984 | Swainson et al. | 365/127 |
| 4,488,260 | 12/1984 | Cantarel | 365/49 |
| 4,532,608 | 7/1985 | Wu | 365/127 |
| 4,559,643 | 12/1987 | Brogardh | 382/1 |
| 4,586,164 | 4/1986 | Eden | 365/127 |
| 4,612,666 | 9/1986 | King | 382/32 |
| 4,627,029 | 12/1986 | Wilson et al. | 365/107 |
| 4,641,350 | 2/1987 | Bunn | 382/34 |
| 4,660,166 | 4/1987 | Hopfield | 364/807 |
| 4,773,024 | 9/1988 | Faggin et al. | 382/15 |
| 4,774,677 | 8/1988 | Buckley | 382/15 |

OTHER PUBLICATIONS

"Prospects for Three-Dimensional Projective and Tomographic Imaging Radar Networks", N. Farhat, C. L. Werner, T. H. Chu, Radio Science vol. 5, pp. 1347-1355, Sep.-Oct. 1984.

"Neural Networks and Physical Sys. with Emergent Coll. Computational Abilities", J. J. Hopfield, Proc. Natl. Acad. Sci. U.S.A., vol. 79, pp. 2554-2558, Apr. 1982, Biophysics.

"Optical Analog of Two-Dimen. Neural Nets. and Their Appln. in Recog. of Radar Targets", Farhat, Miyahara & Lee, Pres. at Neural Nets for Comp. Conf. Snowbird, Utah, '86.

Primary Examiner—David K. Moore
Assistant Examiner—Jose L. Couso
Attorney, Agent, or Firm—Woodcock Washburn Kurtz Mackiewicz and Norris

[57] ABSTRACT

Data analysis systems are provided, especially target imaging and identification systems, which utilize a CAM that associatively stores a plurality of known data sets such as target data sets in a synaptic interconnectivity matrix modeled upon the model of learning of neural networks. In accordance with preferred embodiments the systems are able to identify unknown objects when only a partial data set from the object is available. The system is robust and fast, utilizing parallel processing due to the massive interconnectivity of neural elements so that the image produced exhibits the properties of super-resolution. Since the system is modeled after a neural network, it is fault tolerant and highly reliable.

59 Claims, 5 Drawing Sheets

SUPER RESOLUTION

This application is a continuation of application Ser. No. 07/036,490, filed 4/9/87 now abandoned.

This invention is directed to systems for super-resolution of data sets as in target imaging and identification by utilizing content addressable memory (CAM) architecture which is modeled upon neural networks. More particularly, this invention is directed to optical implementation of a neural network model of a CAM to provide super-resolution of data such as target images. A principal embodiment of this invention is in identification of aerospace targets where only a small amount of target information is available to the system for identification purposes. A further principal embodiment is in robotic sensing where a robot must be able to differentiate a number of stimuli within a short time span in order to efficiently complete its assigned tasks. Other preferred embodiments include a wide array of data analysis tasks including sensory evaluation such as visual, aural and chemical sensor input evaluation.

BACKGROUND OF THE INVENTION

Radar and optical imaging are well known in the art and have been practiced for many years. Present day target imaging and identification systems are limited in the degree of resolution achievable because of constraints in aperture size, wavelength or frequencies which may be utilized to image a discrete object. Holographic imaging held the promise of high resolution of discrete objects by illumination of the object with coherent radiation and reception of the backscattered target data through a large aperture. This method has not proved practical or cost-effective however and does not produce three dimensional images of the target when the target is at a great distance. Since three dimensional imaging is the primary attractive feature of holography, the incentive for utilizing this type of system is diminished if this feature is lost. A typical holographic imaging system is disclosed in U.S. Pat. No. 3,766,533, Black et al. A system for accessing data in three dimensional storage is shown in U.S. Pat. No. 4,471,470, Swainson et al.

More advanced imaging systems have been developed to address the long felt need for high resolution imaging of dilute objects. Systems which operate in the millimeter and microwave regimes measure the amplitude and phase response of targets. These systems utilize spectral degrees of freedom e.g., multiple frequencies, angular diversity, and polarization diversity, to produce a highly resolved image while reducing the number of required "looks" at the target. Furthermore, these systems are "smart sensing" since they perform a certain degree of pre-processing which reduces the dimensionality of the raw data collected by discarding information that is not essential for recognition. For example, because of the nature of electromagnetic scattering a microwave diversity imaging system discards information about flat parts of the target that specularly reflect incident illumination away from the imaging aperture and retains information about edges, protrusions, and other characteristic detail that scatters the illumination broadly and is therefore captured by the imaging aperture. As a result of this scattering behavior the image obtained is automatically edge enhanced representing a "primal sketch" or caricature of the object. It is well appreciated by those with ordinary skill in the art that the generation of a primary sketch is frequently the first step needed in machine recognition. In addition to the above, the image is tomographic and centered in the field of view which are additional desirable features for machine recognition. There is a long-felt need in the art for a cost effective and reliable method to produce super-resolved images. Those with ordinary skill in the art understand that super-resolution refers to reconstructing images from available data with higher resolution than what is predicted by the classical Rayleigh resolution criteria or other similar criteria. By reducing the number of looks required to produce a super-resolved image the number of transmitters can be reduced or, in the alternative, the number of transmittances from a single transmitter may be reduced. This greatly reduces the cost of producing super-resolved images.

The goal of super-resolution is achieved with these types of systems by imaging over a small spectral band width and varying the aspect angle from which the target is viewed. Therefore, less looks at the target are taken which produces less amplitude and phase response information from the target. However, since many spectral degrees of freedom exist an image can be super-resolved with fewer looks at the target.

The sine qua non of super-resolution is that the data collected about the object be analytic (differentiable) over a domain in the complex plane. Typically, however, the signal to noise ratio of the data is quite low for real world targets. Therefore, the signal backscattered, from for example an aerospace target, cannot be said to be analytic over a large enough domain in complex space to produce a function which is susceptible to super-resolution. In a real sense then, systems which utilize spectral degrees of freedom cannot meaningfully be said to fulfill the long felt need for super-resolution of an image from a discrete source.

Techniques for automated recognition of targets exist which produce tomographic images of the targets. Target derived references provide a means for determining the phase of the target without using a fixed reference for a number of receiver and transmitter sets. By varying the aspect angles from which a target is viewed and viewing it with preferably one, rather than a plurality of receiver and transmitter sets, a tomographic image of the target with edge enhanced features can be created which is centered in the field of view of the receiver. The tomographic image will appear as if the target is directly overhead even though it is being viewed,. at various aspect angles. This target derived reference method of obtaining a target's image is useful in classifying an unknown target since the target's range profile is obtained from target derived reference data. The presence of scattering centers on the target causes peak responses in the waveform which produce an edge enhanced image of the target. The features herein described have been dramatically demonstrated by the inventor and his co-authors in a paper published in Radio Science, Vol. 19, No. 5 (1984). With a plurality of known targets stored in memory it is possible to compare the range profiles of the target to those of the known objects so that the target may be identified. The range profile graph of a target is known to those with ordinary skill in the art as the target's sinogram classifier. The sinogram classifier is a preferred embodiment of a data set's feature space classifier.

A system which performs substantially this function is disclosed in U.S. Pat. No. 4,470,048 in the name of Short, III. The invention of the Short III patent does not fulfill the long-felt need for robust, fast processing of data for classification of information such as targets against known data sets, however. It has been proposed to perform such processing in a parallel fashion. Numerous types of systems which perform parallel processing of data stored in content addressable memory (CAM) exist. Such systems are inherently faster than systems which perform bit-by-bit, serial comparisons of known data sets with input data. In general, these systems utilize associative type memories to classify and process incoming data. Associative memories correlate input data with the data itself in order to create a data array for parallel processing of the input data to achieve identification of the input data through comparison with learned data sets. Exemplary CAM architectures with associative memories are disclosed in U.S. Pat. No. 3,766,532, Liebel; U.S. Pat. No. 4,254,476, Burrows; U.S. Pat. No. 4,488,260, Cantarel. However, none of these patents disclose inventions which satisfy the long felt need for robust systems that can identify an unknown data input through comparison with a stored entity when only a small amount of information about the unidentified object is available as input.

Similarly, there is a long felt need in this art for a system which stores learned data sets of or about objects as tomographic images which are centered in the field of view and which are edge enhanced to preserve only the relevant information about the object's major scattering points.

Systems which process and store data optically are well known within the art. Exemplary systems are disclosed in U.S. Pat. No. 4,471,470 Swainson et al; U.S. Pat. No. 4,532,608 Wu; U.S. Pat. No. 4,559,643, Brogardh; U.S. Pat. No. 4,586,164 Eden; U.S. Pat. No. 4,612,666, King; U.S. Pat. No. 4,627,029, Wilson et al; U.S. Pat. No. 4,641,350, Bunn. None of these disclose utilization of CAM architecture or associative type memories for robust, parallel processing of data. In these prior efforts parallel processing is achieved, in part, due to massive interconnectivity of memory elements or active elements. Such interconnectivity is impractical in VLSI or Opto-chemical devices because of physical limitations and the inordinate amount of cross-talk which exists between the connections. Optical implementation of the interconnections between memory elements or active elements would eliminate cross-talk between interconnections and allow the system to perform parallel processing in a fast and efficient manner. A long felt but unfulfilled need in the art thus exists for an imaging and identification system which utilizes CAM architecture with associative memory for parallel processing and can be implemented optically.

Present day target imaging and identification systems are highly susceptible to failure if a memory element is damaged or malfunctions. There is therefore, a long felt need in the art for a system which is fault tolerant. A fault tolerant system would be able to function when a number of memory elements or active elements have failed. None of the CAM architectures which have been mentioned above satisfy the long felt need for such fault tolerant systems.

SUMMARY OF THE INVENTION

There is thus a need in this art area for systems that provide super-resolution of data and which produce robust and fault tolerant output data when input data is compared with known, stored data sets. This need requires optical implementation of CAM architecture with associative memory to provide fast and efficient parallel processing of the input data. This need also requires storage of tomographic, edge enhanced images of known data sets that are centered in the field of view or suitable representations of data sets that capture their distinguishing features and facilitate recognition irrespective of location or distance of the original data set. Furthermore, this need requires that the known data sets be stored in a distributed memory based upon a model of neural networks which provides fault tolerance. This need also requires a robust system so that an output image can be obtained from partial input data such that the output image exhibits the properties of super-resolution.

A preferred embodiment of the invention comprises a first array for receiving data comprising a plurality of neural elements which transmit data signals. A memory matrix for processing the data signals transmitted by the elements of the first array is also provided. The memory matrix has associatively stored therein in accordance with the outer-product or Hebbian model of learning for neural networks, at least one and preferably a plurality of quantized sinogram classifiers of a known data set. A second array is provided having a plurality of neural elements for receiving the data signals processed by the memory matrix. The neural elements of the second array are operatively coupled in feedback with the neural elements of the first array such that the neural elements of the second array provide feedback input for the neural elements of the first array. In a preferred embodiment, associated pairs of elements from the two arrays together with a single row of the memory matrix form a single neural element in the network.

In a preferred embodiment the neural elements of the first array comprise light emitting diodes and the neural elements of the second array comprise photo-detectors. In a preferred embodiment the feedback is electronic. In a more preferred embodiment the neural elements of the first and second array are optical bistability devices and the feedback is optical.

In a preferred embodiment the feature space classifier, more preferably the sinogram classifier, is stored in the memory matrix auto-associatively. In a more preferred embodiment the feature space classifier is stored hetero-associatively. In an even more preferred embodiment the feature space classifier is stored cyclic hetero-associatively. The feature space classifier can, in preferred embodiments, be obtained from electromagnetic and acoustical scattering system means. Similarly, in preferred embodiments the data signals of unknown data sets can be obtained from electromagnetic or acoustical scattering system means.

In a preferred embodiment, the feedback input reaches the steady state such that the system auto-associates. In a more preferred embodiment the feedback input reaches the steady state such that the system hetero-associates. In an even more preferred embodiment, the feedback input reaches the steady state such that the system "cyclic hetero-associates" as defined below.

Methods for data analysis are disclosed. In a preferred embodiment the method comprises quantizing a feature space classifier, more preferably the sinogram classifier, of at least one known data set. The quantized feature space classifier is then associatively stored in a memory matrix in accordance with Hopfield's model of learning for neural networks which utilizes the Hebbian model of associative memory, hereinafter referred to as the Hopfield model. Data signals are input to a first array comprising neural elements. The input data signals are transmitted from the neural elements of the first array to a memory matrix for processing. A second array comprising neural elements receives the processed data which is then fed back to the first array so that output from the second array becomes feedback input data for the first array. The data is input to the first array in a manner which allows the first array to receive the feedback signals.

In a preferred embodiment of the method for data analysis, the quantized feature space classifier, more preferably the sinogram classifier, is stored auto-associatively. In a more preferred embodiment, the quantized feature space classifier is stored hetero-associatively. In a more preferred embodiment, the quantized feature space classifier is stored cyclic hetero-associatively. The memory matrix in a preferred embodiment is synaptic. A synaptic memory matrix is comprised of elements which can be modified. The memory matrix is interconnected in preferred embodiments. In an interconnected memory matrix every element of the matrix is in communication with every other element of the matrix.

A preferred embodiment of the method of data analysis comprises feedback which achieves steady state such that the system auto-associates. A more preferred embodiment comprises feedback which reaches steady state such that the system hetero-associates. An even more preferred embodiment comprises feedback which reaches steady state such that the system cyclic hetero-associates.

OBJECTS OF THE INVENTION

It is a principal object of this invention to provide systems for super-resolution of data.

It is an object of the present invention to provide systems for data analysis, especially target imaging and identification.

It is a further object of the present invention to provide CAM architectures to accomplish such data analysis especially, target imaging and identification.

It is a still further object of the invention to model the CAM upon the distributive model of memory of neural networks.

It is a still further object of the invention to store associatively within the CAM a binarized data representative of known data sets.

It is a still further object of the invention to provide robust processing of data such as identification of a target with known data sets stored associatively in the CAM means when only a small amount of input data from the target is available such that the image displays the properties of super-resolution.

It is a still further object of the invention to provide a fault tolerant system for data analysis such as target imaging and identification and sensor data evaluation.

It is another object of the invention to provide systems for target imaging and identification by parallel processing.

BRIEF DESCRIPTION OF THE DRAWINGS

FIG. 2b is a representation of the sinogram classifier of the known object of FIG. 2a.

Figure 1:
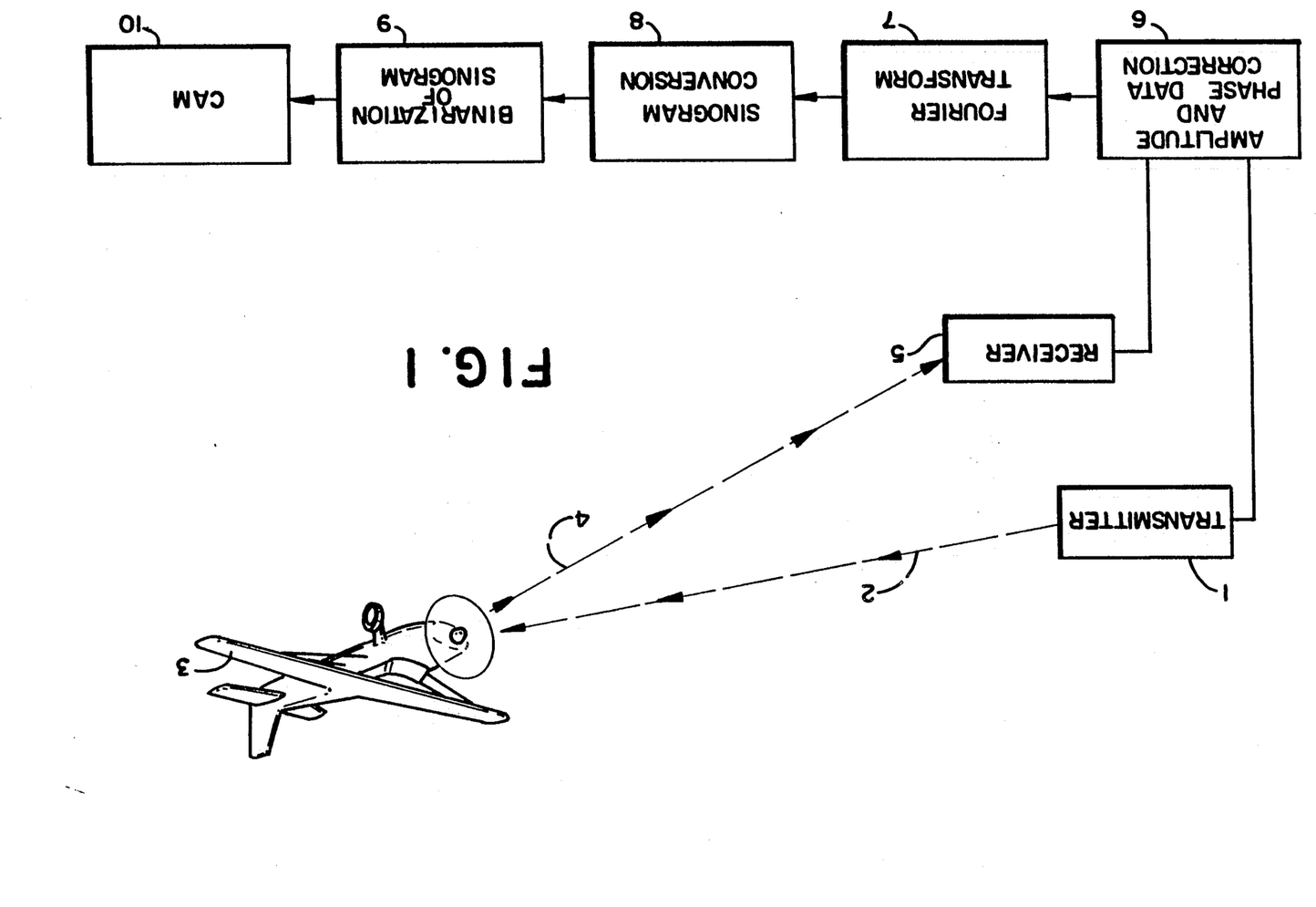
FIG. 1 is a block diagram of a preferred embodiment of a system in accordance with the invention which utilizes CAM architecture modeled on Hopfield's model to associatively store a binarized version of the sinogram classifiers of known objects' data sets.

Preferred embodiments of the invention provide systems for target imaging and identification. The target imaging and identification systems of this invention utilize CAM architectures modeled upon neural networks. A neural element is a memory element that is bistable. The CAM has associatively stored within it, data sets of known objects. Referring to FIG. 1 a system to create binary coded data sets is illustrated. Transmitter 1 emits signal 2 which backscatters from the discrete object to be identified 3. The backscattered signal 4 is received by receiver 5. The signal 2 is preferably a multiple frequency signal across a small bandwidth which provides the required spectral degrees of freedom to limit the number of "looks" required to obtain a tomographic, edge enhanced image which is centered in the field of view in a fashion known to those of ordinary skill in the art. The data from discrete object 3 preferably is taken at varying aspect angles.

The data received is then preferably processed, 6 to correct amplitude and phase aberrations and Fourier Transformed, 7 to give a representation of the image in its Fourier space. The Fourier Transform of the object is then converted 8 to a sinogram of the object which is preferably the range profile which is known by those with ordinary skill in the art to be the Fourier Transform of data from individual looks as plotted against aspect angle from which the object was viewed. The sinogram classifier 8 is a preferred embodiment of the object's general feature space classifier. The range profiles of the object as plotted against the object's aspect angle is the object's sinogram classifier. The sinogram classifier of the object is then binarized 9 to ensure that there is a substantial Hamming distance between the sinogram patterns thus allowing a CAM, 10 to distinguish among objects stored in it. Hamming distance, as understood by those with ordinary skill in the art, is the number of differences between two binarized entities with respect to a bit-by-bit comparison.

Figure 2A:
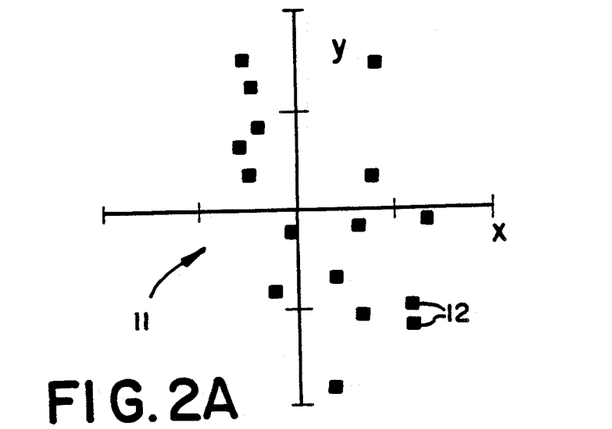
FIG. 2a is a representation of the major scattering points of a simplified known object.
Figure 2B:
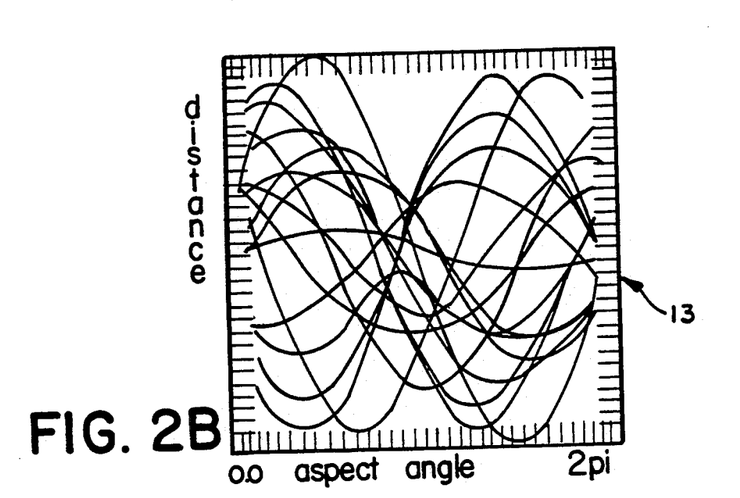
Figure 2C:
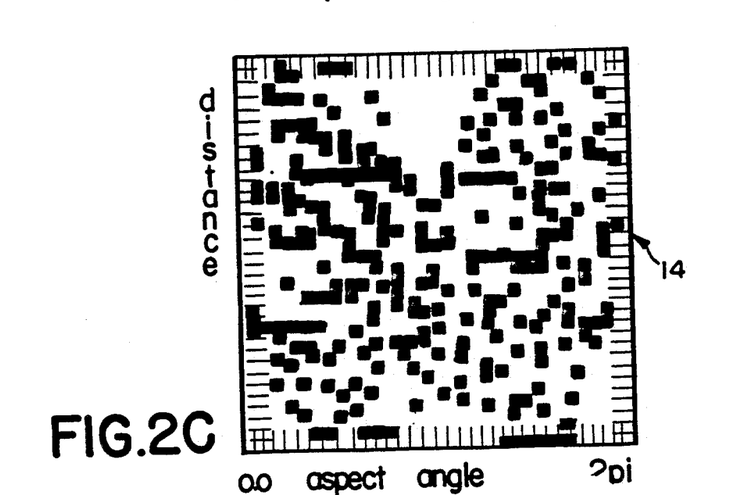
FIG. 2c is a representation of the binarized sinogram classifier of FIG. 2b.

FIGS. 2a–2c provide an illustration of construction of a binarized sinogram for an object. An object is shown on a cartesian coordinate system 11 represented by sixteen discrete scattering points shown generally at 12. When range profiles of an object are plotted as is preferred, the sinogram classifier of the object 13 is created as shown in FIG. 2b. The sinogram classifier 13 exhibits sinusoidal traces and is generally plotted in an N×N format wherein $N^2$ represents a number of analog elements. When the sinogram classifier 13 is binarized, a version of it which is spatially quantized in an N×N element format yields a set of unipolar binary (UB) matrices 14 shown in FIG. 2c wherein a black element represents unity and a white element zero. Thus, when the binarized sinograms are stored in the memory matrix they act as interconnection weights between neural elements in the network where information is stored.

It then becomes necessary to "teach" the CAM the binarized version of the sinogram classifier so that the CAM can identify unknown objects upon comparing input data with known data sets. The CAM in accordance with this invention is preferably modeled upon the neural network model of distributed synaptic memory hereinafter referred to as the "Hopfield model of learning for neural networks." This model applies the Hebbian model of associative learning as described by Hopfield in his article in Proc. Natl. Acad. Sci. U.S.A., 79, 2554 (1982). A paper authored by the inventor which was presented at the Neural Networks for Computing Conference illustrates a preferred embodiment of the invention See N. H. Farht et al., "Optical Analog of Two Dimensional Neural Networks and Thier Application in Recognition of Radar Targets," Proceedings of Neural Nets for Computing Conference, Snowbird, Ut., 1986. The Hopfield model forms a memory matrix or "synaptic interconnection" using the Hebbian model of associative learning. For purposes of the exemplary material of this specification, the model is derived on the basis of 2-D binary inputs however, the invention may be generalized to an R-dimensional neural network where R=1,2,3 . . . .

Let, $b_{ij}^{(m)}$; $i,j = 1,2 \ldots N$, $m = 1,2 \ldots M$, be a set of M, 2-D unipolar binary (UB) matrices representing quantized object functions or their feature spaces e.g. sinogram representations. The synaptic interconnection matrix is formed by the formula:

$$T_{ijkl} = \begin{bmatrix} \sum_{m=1}^{M} V_{ij}^{(m)} V_{kl}^{(m)} \ldots i,j,k,l = 1,2 \ldots N \\ 0 \ldots i,j = k,l \end{bmatrix} \quad [1]$$

where $V_{ij}^{(m)} = (2b_{ij}^{(m)} - 1)$ are binary bipolar (BB) versions of the $b_{ij}^{(m)}$. In equation. [1], each element of a $V_{ij}^{(m)}$ matrix is multiplied by all other elements to yield a new N×N matrix in which the self product is zero. This process yields $N^2$, matrices each of rank N, in this exemplary case a four-dimensional $T_{ijkl}$ memory matrix, thereby distributing the memory amongst all the synapses to provide a robust, fault tolerant system. The resulting $T_{ijkl}$ is multi-valued with its elements ranging in value between $-M$ to $+M$ in steps of two.

In a preferred embodiment, the $T_{ijkl}$ matrix is hard clipped, albeit with some sacrifice in performance, by confining the values of its elements to $+1$, $0$, or $-1$ depending on whether the value of an element is positive, zero or negative. Such a ternary matrix has the advantage of simplifying memory mask design of the synaptic interconnection matrix in actual hardware when the CAM is realized optically. Equation [1] reflects auto-associative storage in a preferred embodiment. In a still more preferred embodiment, the CAM utilizes hetero-associative storage which can be represented as:

$$T_{ijkl} = \begin{bmatrix} \sum_{m=1}^{M} V_{ij}^{(m)} U_{kl}^{(m)} \ldots i,j,k,l = 1,2 \ldots N \\ 0 \ldots i,j = k,l \end{bmatrix} \quad [2]$$

where,
$V_{ij}^{(m)} = (2b_{ij}^{(m)} - 1)$ and
$U_{kl}^{(m)} = (2a_{kl}^{(m)} - 1)$ and
$a_{kl}^{(m)}$; $k,l = 1,2 \ldots N$, $m = 1,2 \ldots M$ is a unique set of M, 2-D unipolar binary (UB) matrices different from $b_{ij}^{(m)}$ In an even more preferred embodiment, the CAM utilizes cyclic hetero-associative storage (the associative wheel) which can be represented as:

$$T_{ijkl} = \begin{bmatrix} \sum_{m=1}^{M-1} [(2b_{ij}^{(m)} - 1)(2b_{kl}^{(m+1)} - 1) + \\ (2b_{ij}^{1} - 1)(2b_{kl}^{(M)} - 1)] \ldots i,j,k,l = 1,2 \ldots N \\ 0 \ldots i,j = k,l \end{bmatrix} \quad [3]$$

Whichever embodiment is utilized, auto-associative, hetero-associative or the associative wheel, to construct the synaptic interconnectivity matrix the system preferably determines whether an input UB matrix $b_{ij}^{(mo)}$ is one of the stored entities within the CAM. This is accomplished by forming the product:

$$V_{ij}^{(mo)} = \sum_{k,l}^{N} T_{ijkl} b_{kl}^{(mo)} \ldots i,j,k,l = 1,2 \ldots N \quad [4]$$

This matrix product is performed by partitioning the four-dimensional matrix $T_{ijkl}$ into an array of N × N square matrices each of rank N, i.e., $$T_{ijkl} = T_{11kl} + T_{12kl} + \ldots + T_{1Nkl} + T_{21kl} + T_{22kl} + \ldots + \quad [5]$$
$$T_{2Nkl} + \ldots + T_{Nlkl} + \ldots + T_{NNkl}.$$

Each term of equation [5] is then multiplied by $b_{kl}^{(mo)}$ and the result summed to give a new resulting matrix. The result of this operation is a new N×N matrix $V_{ij}^{(mo)}$ whose elements are multi-valued. It is convenient to threshold this resultant matrix by replacing all negative and zero values by zero and all positive elements by unity. This gives rise to a new U.B. matrix. $^{(1)}b_{ij}^{(mo)}$ which represents the result of the first iteration. The matrix $^{(1)}b^{(mo)}$ is, in turn, a new input to the synaptic interconnection or memory matrix where the process, starting with equation [4], is repeated until the output resolves into a steady state.

If the initializing input $b_{ij}^{(mo)}$ corresponds to one of the stored entities $b_{ij}^{(m)}$ or is close to it in the Hamming sense then, with high probability, the output will converge after a few iterations to the stored entity closest to $b_{ij}^{(mo)}$. Therefore, this invention satisfies a long felt need for a robust fault tolerant target imaging and identification system since it performs as an associative CAM in which a closest neighbor search is performed efficiently because of the inherent parallelism, global interconnectivity and threshold feedback of the algorithm employed. From this discussion it can be seen that the $T_{ijkl}$ memory matrix is a synaptic weighting function which scales an input signal and drives the firing of neural elements, hereinafter neurons, in the neural network.

Figure 3:
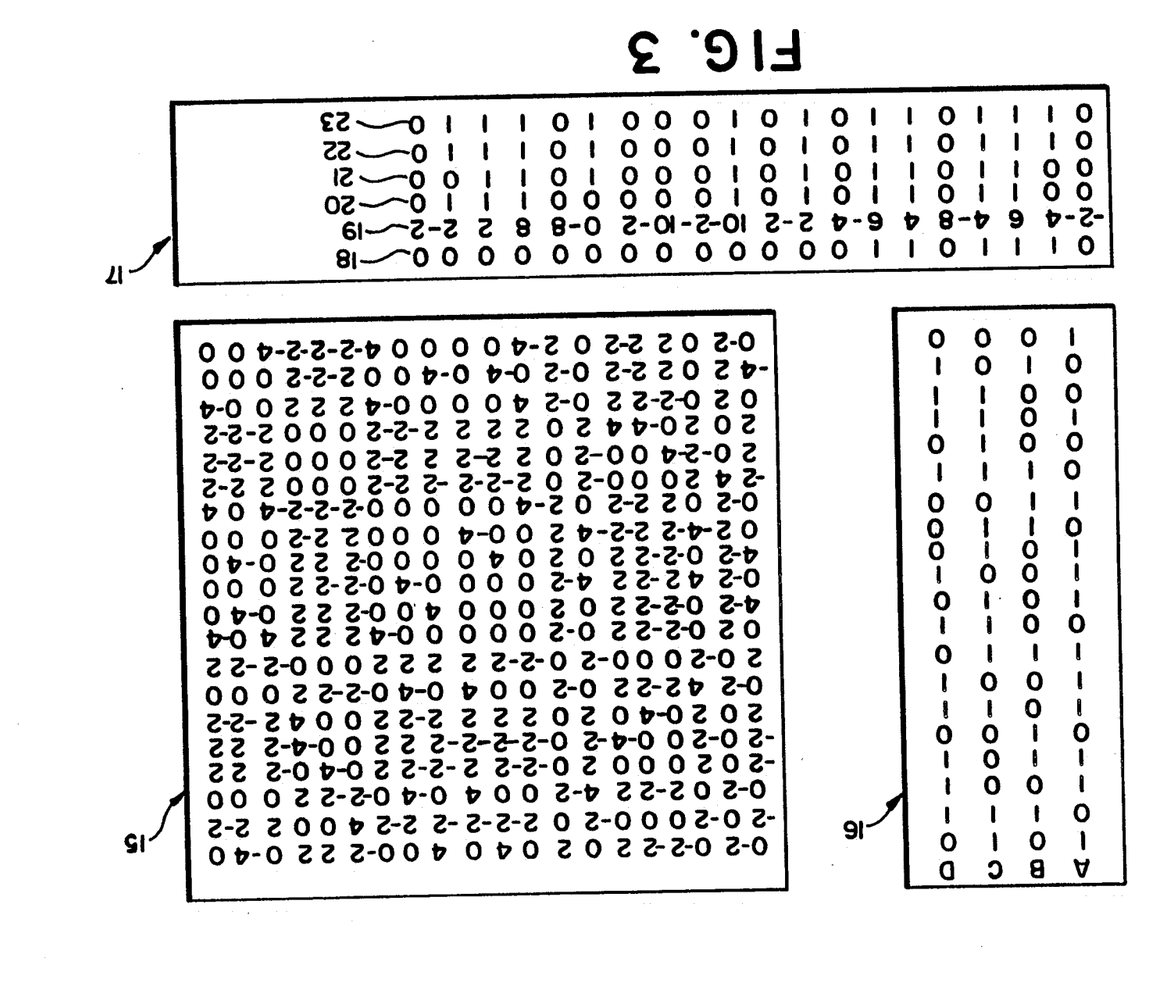
FIG. 3 is an example of the CAM's performance of nearest neighbor searches of the synaptic interconnectivity matrix to identify a partial unknown input against known inputs associatively stored in the matrix wherein, in a preferred embodiment, one-dimensional binarized representations are assumed for simplicity.

Referring now to FIG. 3 an example of a synaptic interconnection matrix is shown generally at 15. The memory matrix is 20×20 (N=20). The memory matrix is composed of four learned data sets shown generally at 16 that represent the U.B. matrices $b_i^{(mo)}$ where, for this example, the data sets are one-dimensional. The data sets are stored in the synaptic interconnection matrix auto-associatively in this preferred embodiment. A numerical simulation of the process of applying equation [4] is shown generally at 17. The partial input of the D vector is shown, 18. The last 13 bits of the partial input have been set to zero (representing incomplete data) which then provides the initializing test UB matrix $b_i^{(mo)}$. The first estimate after applying equations [4] and [5] is shown at 19 while the thresholded version of the first estimate is shown at 20. The second iteration, 21 is closer to the stored entity D and by the third iteration, 22 the system has reached a stable state in the nearest neighbor search. A fourth iteration 23 shows that the D vector has been identified. Since only four iterations were necessary to identify the unknown target from the partial input 18 the CAM has demonstrated a robust, fault tolerant nature and the ability to provide super-resolution of the unknown target. This is accomplished even though the Hamming distance between the D vector and the unknown partial input 18 is only six.

Figure 4:
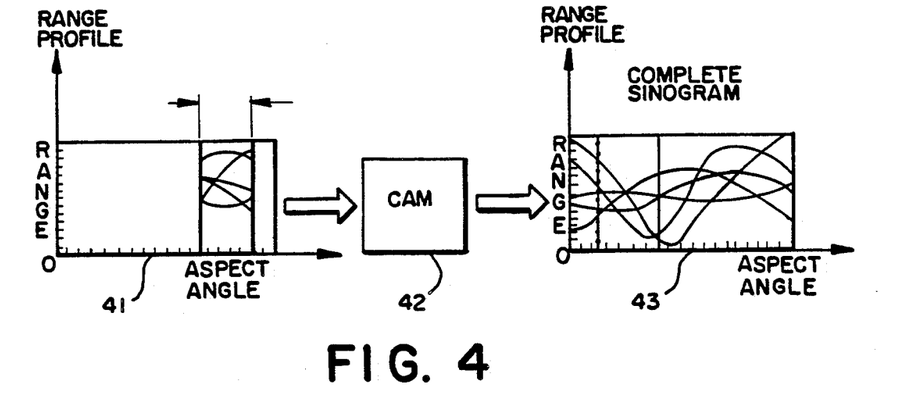
FIG. 4 is a block diagram of a CAM's function of taking a partial input of an unknown object and robustly identifying the unknown object such that the image displays super-resolution.

Referring to FIG. 4, a block diagram of the function of the CAM is illustrated. A partial input sinogram shown at 41 is generated. The partial input is given to the CAM 42 which has associatively stored in it known data sets in a synaptic interconnectivity matrix. Upon performing nearest neighbor searches, CAM 42 identifies partial input 41 and outputs an associative image i.e., a complete sinogram 43.

Figure 5:
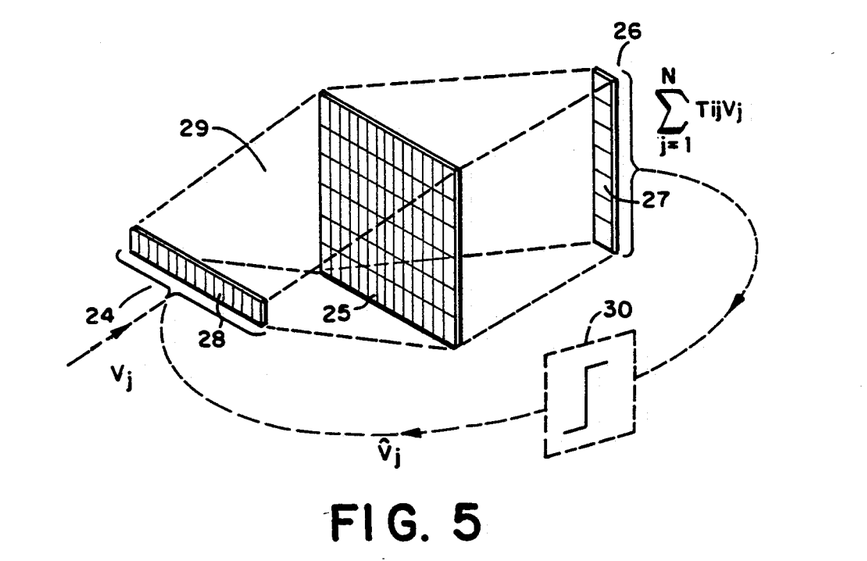
FIG. 5 is an illustration of a preferred embodiment of a CAM wherein the neural elements are formed by an array of light emitting diodes and an array of photodetectors and the feedback loop is implemented electrically. The memory matrix representing the weights of interconnections between neural elements is implemented in preferred embodiments by an optical mask that can be fixed or externally modified.

In a preferred embodiment, the system is implemented optically. Referring to FIG. 5 the state of the neurons, i.e. whether firing or not firing, is shown generally as a light emitting array, hereinafter LEA, at 24 (in an exemplary one-dimension) wherein the LEA 24 represents the BB vector of an unknown partial input, $V_j$. The individual elements 28 of LEA 24 are associated with separate neurons and, in a preferred embodiment, are comprised of Light Emitting Diodes (LEDs). The $T_{ij}$ synaptic interconnection weighting memory matrix is shown at 25. In a more preferred embodiment, the memory matrix 25 is implemented photographically such that the LEA 24 of neurons 25 emits incoherent light which is substantially absorbed or substantially transmitted through the opaque or transparent portions respectively of the memory matrix 25. In an even more preferred embodiment the $T_{ij}$ is implemented as a clipped memory matrix wherein the elements of the matrix are limited to the values of −1, 0 and 1. This allows practical implementation of memory matrix 25 in a preferred embodiment through a photo-lithographic mask with either totally opaque sections or totally transparent sections. In a more preferred embodiment, the implementation of a modifiable memory matrix through the use of programmable, nonvolatile spatial light modulators (SLMs) known to those with ordinary skill in the art is achieved. The use of such SLMs under computer control enables rapid scrolling through many memory matrices stored in computer memory to markedly expand the nearest search capacity of the CAM.

Once the incoherent light 29 passes through the $T_{ij}$ mask, 25 the first iteration in equation [4] has been accomplished optically. The signal falls on a detector such as a photo-detector array, hereinafter PDA, 26. In a preferred embodiment, the PDA's individual elements, 27 are photo-detectors which furnish an electrical output when light falls on them. The individual photo-detectors, 27 are connected to individual elements 28 of the LEA 24 through thresholding elements in the feedback loop 30 which, in a preferred embodiment, is an electrical feedback connection emanating from the PDA, 26. The LEA elements 28 will fire or not fire depending on whether or not the amount of light incident on the photo-detector element 27 produces an output that exceeds the electronic threshold or not. Therefore, the $T_{ij}$ 25 acts as a weighting function to determine ultimately which elements 28 of the LEA 24 will turn on. The signal from PDA 26 is fed back to LEA 24. In this manner successive iterations are performed according to, in this exemplary case, a one-dimensional version of equation [4] which thus represents a nearest neighbor search of $T_{ij}$ 25. The search iterates until a steady state identification of an entity associatively stored in $T_{ij}$ 25 is achieved and displayed on LEA 24.

Figure 6:
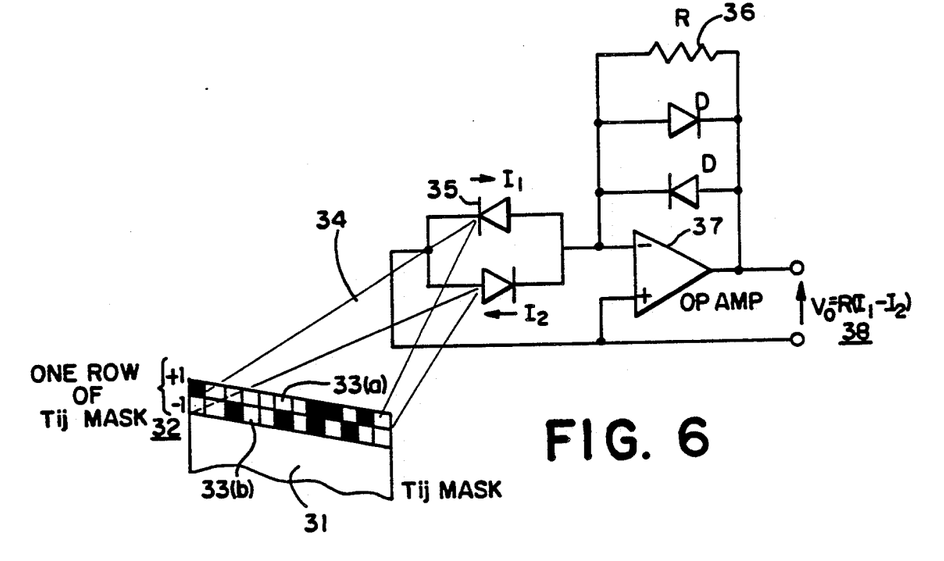
FIG. 6 is a circuit diagram of a preferred embodiment showing a feedback loop when the output of the photodetector array is an electrical signal.

In FIG. 6, a preferred embodiment of the optical implementation of the CAM is illustrated. In a preferred embodiment, the $T_{ij}$ memory matrix, 31 is constructed from a photographic transparency wherein each row, 32 of the $T_{ij}$ matrix, 31 is divided into subrows shown at 33(a) and 33(b). The $T_{ij}$, 31 is the clipped version of the synaptic interconnectivity matrix. Therefore, for any row 32 of $T_{ij}$ 31 the positive values of row 32 are assigned to transparent pixels in subrow 33(a) while negative values of row 32 are assigned to transparent pixels in subrow 33(b). The light 34 falls on the PDA 35 which, in this embodiment, produces current $I_1$ and $I_2$. After currents I , and $I_2$ pass through resistor 36 and operational amplifier 37, output voltage 38 is created. Output voltage 38 is then fed back for successive iterations.

Figure 7:
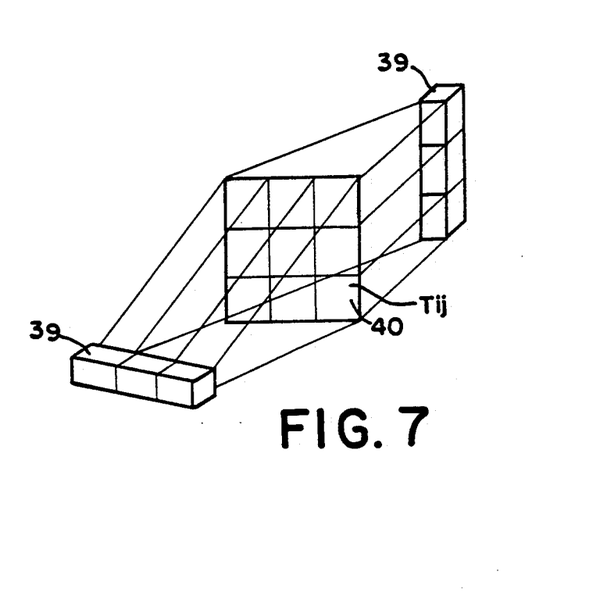
FIG. 7 is a preferred embodiment of a CAM wherein the feedback loop is realized optically and the neural elements are implemented with optical bistability devices.

FIG. 7 is an even more preferred embodiment of the systems of this invention. This system utilizes optical feedback with optical bistability devices (OBD) shown at 39. A more preferred embodiment utilizing OBD's 39 is attractive because OBD's are non-linear optical light amplifiers which employ internal feedback. The $T_{ij}$ 40 may be implemented in a similar fashion as described in FIG. 6 but the OBD's embodiment as shown in FIG. 7 leads to a simple, compact CAM structure that may be interconnected to perform higher order computations than the nearest neighbor search performed by a single CAM.

This invention thus provides systems for data analysis which utilize associative CAM. The CAM is modeled upon neural networks and uses distributed memory stored in a synaptic interconnectivity memory matrix. The CAM is fault tolerant, robust and performs parallel processing of partial data from an unknown object to identify the object against known data sets stored in the memory matrix. The system is fast, and efficient and provides super-resolution of images. The invention herein disclosed is directed to data analysis in general. It will be appreciated by those with ordinary skill in the art that applications of this invention exist in, but are not limited to, the fields of sonar analysis of data, electromagnetic analysis of data and robotic sensing.

There has thus been disclosed a system and method to provide super-resolution. The system utilizes a CAM based upon a model of neural networks so that in a preferred embodiment, the identification of an unknown data signal with a known data set can be determined when only a partial input of the unknown data set is available. The specification and appended claims provide a description of preferred embodiments. However, other preferred embodiments are within the scope and spirit of the invention and will be appreciated by those with ordinary skill in the art.

What is claimed is:

1. A data analysis system comprising:
    a first array for receiving input data comprising a plurality of neural elements for transmitting data signals;
    a memory matrix for processing the data signals transmitted by the elements of the first array, said memory matrix having associatively stored therein in accordance with a Hebbian model of learning for neural networks, at least one quantized feature space classifier of a known data set;
    a second array having a plurality of neural elements for receiving the data signals processed by the memory matrix;
    the neural elements of the second array being operatively coupled in feedback with the neural elements of the first array wherein the neural elements of the second array provide feedback input for the neural elements of the first array.

2. The system of claim 1, wherein the neural elements of the first array comprise light emitting elements.

3. The system of claim 1, wherein the neural elements of the second array comprise photo-detectors.

4. The system of claim 1, wherein the feedback is electronic.

5. The system of claim 1, wherein the neural elements of the first and second arrays are optical bistability devices.

6. The system according to claim 1, wherein the feedback is optical.

7. The system of claim 1, wherein the feature space classifier of the known data set is stored auto-associatively.

8. The system of claim 1, wherein the feature space classifier of the known data set is stored hetero-associatively.

9. The system of claim 1, wherein the feature space classifier of the known data set is stored cyclic hetero-associatively.

10. The system of claim 1, further comprising means for gathering electromagnetic scattering data for construction of the feature space classifier of a known data set.

11. The system of claim 1, further comprising means for gathering acoustical scattering data for construction of the feature space classifier of a known data set.

12. The system of claim 1, further comprising means for gathering electromagnetic scattering data for input to the first array.

13. The system of claim 1, further comprising means for gathering acoustical scattering data for input to the first array.

14. The system of claim 1, wherein the feedback input reaches steady state auto-associatively.

15. The system of claim 1, wherein the feedback input reaches steady state hetero-associatively.

16. The system of claim 1, wherein the feedback input reaches steady state cyclic hetero-associatively.

17. The system of claim 1, wherein the memory matrix is synaptic.

18. The system of claim 1, wherein the memory matrix is interconnected.

19. The system of claim 1, wherein the feature space classifier is a sinogram classifier.

20. A data analysis system comprising:
    a first array for receiving input data comprising a plurality of optical neural elements for transmitting optical data signals;
    a memory matrix for optically processing the optical data signals transmitted by the optical neural elements of the first array, said memory matrix having associatively stored therein in accordance with a Hebbian model of learning for neural networks, at least one quantized feature space classifier of a known data set;
    a second array comprising a plurality of optical neural elements for receiving the optical data signals processed by the memory matrix;
    the optical neural elements of the second array being operatively coupled in feedback with the optical neural elements of the first array whereby the neural elements of the second array provide feedback input for the neural elements of the first array.

21. The system of claim 20, wherein the optical neural elements of the first array comprise light emitting elements.

22. The system of claim 20, wherein the neural elements of the second array are photo-detectors.

23. The system of claim 20, wherein the feedback is electronic.

24. The system of claim 20, wherein the feedback is optical.

25. The system of claim 20, wherein the neural elements of the first and second arrays are optical bistability devices.

26. The system of claim 20, wherein the sinogram classifier of the data set is stored auto-associatively.

27. The system of claim 20, wherein the sinogram classifier of the known data set is stored hetero-associatively.

28. The system of claim 20, wherein the sinogram classifier of the known data set is stored cyclic hetero-associatively.

29. The system of claim 20, further comprising means for gathering electromagnetic scattering data for construction of the feature space classifier of a known data set.

30. The system of claim 20, further comprising means for gathering acoustical scattering data for construction of the feature space classifier of a known data set.

31. The system of claim 20, further comprising means for gathering electromagnetic scattering data for input to the first array.

32. The system of claim 20, further comprising means for gathering acoustical scattering data for input to the first array.

33. The system of claim 20, wherein the feedback input reaches steady state auto-associatively.

34. The system of claim 20, wherein the feedback input reaches steady state hetero-associatively.

35. The system of claim 20, wherein the feedback input reaches steady state cyclic hetero-associatively.

36. The system of claim 20, wherein the memory matrix is synaptic.

37. The system of claim 20, wherein the memory matrix is interconnected.

38. The system of claim 20, wherein the feature space classifier is a sinogram classifier.

39. A method of data analysis comprising the steps of:
quantizing a feature space classifier of at least one known data set;
associatively storing said quantized feature space classifier in a memory matrix in accordance with a Hebbian model of distributed memory of neural networks;
inputting data signals to a first array comprising neural elements;
transmitting the input data signals from the neural elements of the first array to the memory matrix for processing;
receiving the processed data signals with a second array comprising neural elements;
feeding back the signals received by the second array to the first array so that output from the second array becomes feedback input data for the first array.

40. The method of claim 39, wherein the feature space classifier is stored auto-associatively.

41. The method of claim 39, wherein the feature space classifier is stored hetero-associatively.

42. The method of claim 39, wherein the feature space classifier is stored cyclic hetero-associatively.

43. The method of claim 39, wherein the memory matrix is synaptic.

44. The method of claim 39, wherein the memory matrix is interconnected.

45. The method of claim 39, wherein the feedback input reaches steady state auto-associatively.

46. The method of claim 39, wherein the feedback input reaches steady state hetero-associatively.

47. The method of claim 39, wherein the feedback input reaches steady state cyclic hetero-associatively.

48. The method of claim 39, wherein the feature space classifier a sinogram classifier.

49. A method of data analysis comprising the steps of:
quantizing a feature space classifier of at least one known data set;
associatively storing said quantized feature space classifier in a memory matrix in accordance with a Hebbian model of distributed memory of neural networks;
inputting data signals to a first array comprising optical neural elements;
optically transmitting the input data signals from the optical neural elements of the first array to the memory matrix for optical processing;
receiving the optically processed data signals with a second array comprising optical neural elements;
feeding back the signals received by the second array to the first array so that output from the second array becomes feedback input data for the first array.

50. The method of claim 49, wherein the feature space classifier is stored auto-associatively.

51. The method of claim 49, wherein the feature space classifier is stored hetero-associatively.

52. The method of claim 49, wherein the feature space classifier is stored cyclic hetero-associatively.

53. The method of claim 49, wherein the memory matrix is synaptic.

54. The method of claim 49, wherein the memory matrix is interconnected.

55. The method of claim 49, wherein the feedback input reaches steady state auto-associatively.

56. The method of claim 49, wherein the feedback input reaches steady state hetero-associatively.

57. The method of claim 49, wherein the feedback input reaches steady state cyclic hetero-associatively.

58. The method of claim 49, wherein the feature space classifier is a sinogram classifier.

59. The system of claim 19 wherein the sinogram classifier is binarized in a unipolar binary matrix and stored in the Hebbian memory matrix.

* * * * *